United States Patent

Gordon et al.

[15] 3,673,346

[45] June 27, 1972

[54] SOUND REPRODUCING AND OPTICAL PROJECTOR FUNCTION CONTROL APPARATUS

[72] Inventors: Hershel Gordon, Cheltenham Township; Charles R. McAdoo, Jr., Holland, both of Pa.

[73] Assignee: Optisonics Corporation, Montgomeryville, Pa.

[22] Filed: April 13, 1970

[21] Appl. No.: 27,583

[52] U.S. Cl. ........................................ 179/100.2 S
[51] Int. Cl. ........................ G03b 31/06, G11b 31/00
[58] Field of Search ........................................ 179/100.2 S

[56] References Cited

UNITED STATES PATENTS

| | | | |
|---|---|---|---|
| 3,276,315 | 10/1966 | Chalfin | 179/100.2 S |
| 3,420,966 | 1/1969 | Wright | 179/100.2 S |
| 3,480,738 | 11/1969 | Meyer et al. | 179/100.2 S |
| 3,305,645 | 2/1967 | Nisbet | 179/100.2 S |
| 2,975,672 | 3/1961 | Shields | 179/100.2 S |

*Primary Examiner*—Howard W. Britton
*Assistant Examiner*—Robert S. Tupper
*Attorney*—D. R. Pressman

[57] ABSTRACT

A sound reproducing apparatus includes a two channel magnetic tape and transducing head with associated circuitry. A first channel records and reproduces sound. A second channel reproduces and records function control information for controlling the function of an optical projector. The second channel may be used to reproduce and record function control information for controlling the magnetic tape drive motor, or other selected functions. Function control information is in the form of pulses at distinctive frequencies.

10 Claims, 6 Drawing Figures

SOUND REPRODUCING AND OPTICAL PROJECTOR FUNCTION CONTROL APPARATUS

This invention relates to sound reproducing and optical projector function control apparatus. More particularly, this invention relates to apparatus which records and reproduces sound, and also records and reproduces function control information for controlling certain functions of an optical projector such as changing slides or advancing a film strip frame to frame.

There are a number of systems for automatically synchronizing the sound and film advance in an optical projector. Such systems normally include a single channel magnetic tape on which is recorded the audio portion of the combined visual and audio presentation. The projector is designed to respond to synchronized function control signals also recorded on the same channel as the audio portion of the presentation. These function control signals are normally used to initiate an advance of the slide projector from slide to slide, or from frame to frame in the case of a film strip projector.

Such systems suffer from a number of problems. Among these is the fact that the function control signal is recorded on the same track as the audio portion of the presentation. This has several disadvantages. First, the listener hears an annoying burst of sound just prior to the film advance if the function control signal is in the audio portion of the spectrum. Another disadvantage is in the process of programming the tape. Since the function control signal is recorded on the same track as the audio portion of the presentation, erasing the function control signal and repositioning it necessarily results in blank spaces and the erasure of portions of the audio information. Thus, if a user desires to reposition a function control signal, he must first erase the signal and then record it at the new position. Erasing the first signal does not replace the audio portion already blanked out by the signal. Moreover, any slight error in positioning the tape during the erase procedure can result in erasure of a portion of the audio presentation. Thus, programming the synchronizing or function control signals without deleterious effect upon the audio portion of the presentation is very difficult.

Those skilled in the art will recognize that there are other disadvantages and problems inherent in the use of a single channel system for both the audio and the control functions.

In accordance with the present invention the disadvantages of a single channel system are overcome by providing a two channel system for automatically synchronizing the sound and film advance in an optical projector. In the system disclosed herein one channel of the system is devoted exclusively to recording and reproducing the audio portion of the presentation. The second channel, on the other hand, is used to record and playback function control information. This function control information can be in the form of audio frequency pulses which are synchronized to the sound on the first channel to advance or otherwise control the optical projector. The advantage of such a system is that the function control information is completely isolated from the audio information. Thus, function control frequency pulses can be recorded and erased at will without affecting the audio portion of the presentation.

Still another advantage of the present invention is that more than one type of function control information can be readily recorded and reproduced in the second channel. For example, a pulse of one frequency can be used to control a particular function of the optical projector and a pulse of another frequency can be used to control a function of the audio recording and reproduction system itself. A pulse of still another frequency can be added to control yet another function of the optical projector. For example, a first pulse at a first frequency can be used to advance the optical projector, a second pulse at a second frequency can be used to stop the tape drive motor, and a third pulse at a third frequency can be used to reverse the optical projector. Incorporating such diverse functions in a single track system with facility and ease of use would be extremely difficult.

The foregoing and other advantages of the present invention are obtained by providing a tape recorder having a two channel (track) record-playback tape head. The magnetic tape itself is preferably the type normally used with a single channel (track) tape recorder. One track of the tape head is electrically associated with a conventional playback-record circuit and loud speaker such as is found in all tape recorders. The other channel provides a means for recording and playing back the function control signals in the form of alternating current pulses. Upon playback of the pulses, switch means are also provided for initiating control functions. In one form of the invention the control pulses may be at two or more frequencies for providing different control functions in the optical projector or the tape recorder itself. Means are also provided for erasing the control function pulses.

For the purpose of illustrating the invention, there are shown in the drawings forms which are presently preferred; it being understood, however, that this invention is not limited to the precise arrangements and instrumentalities shown.

Figure 1:
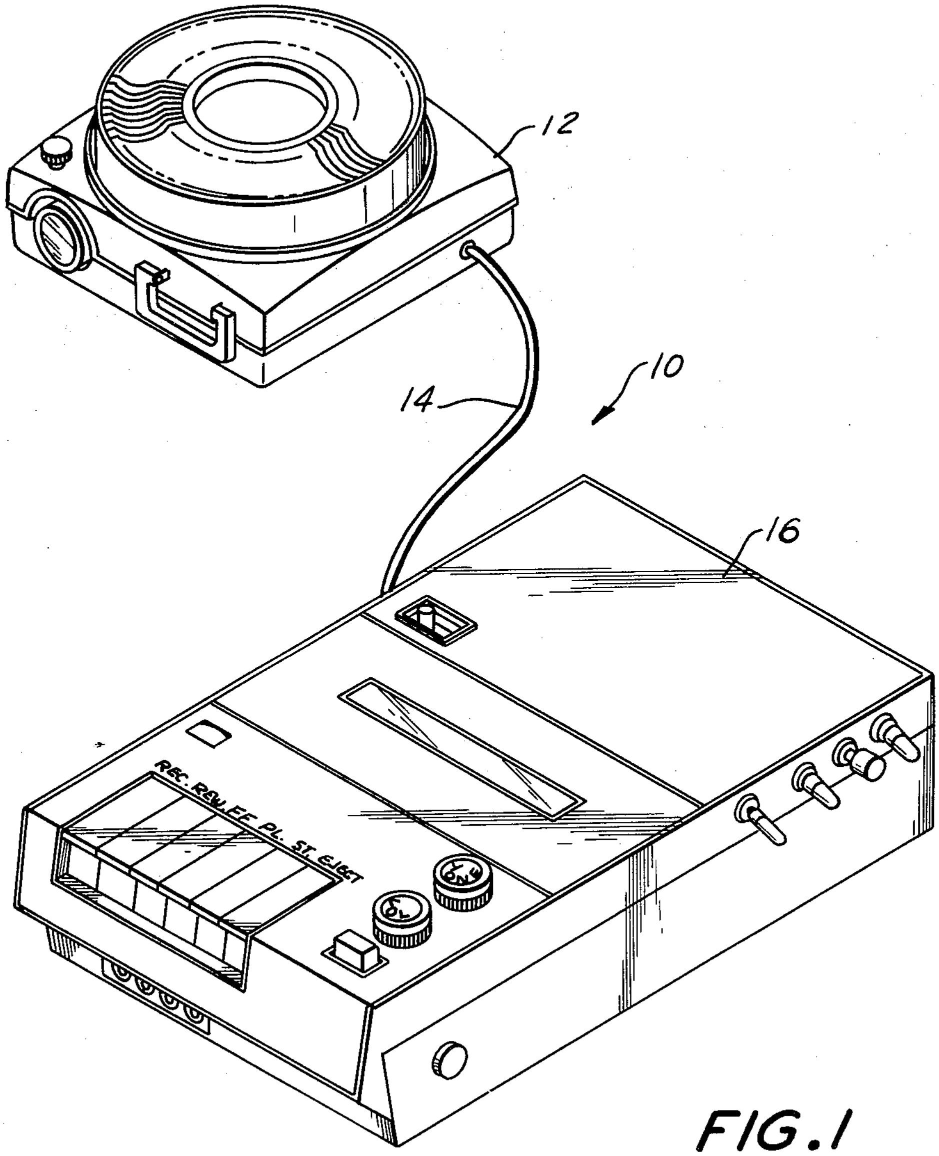
FIG. 1 is a perspective view of a slide projector and a recorder-playback apparatus in accordance with the present invention.

Referring now to the drawings in detail, wherein like numerals indicate like elements, there is shown in FIG. 1 a perspective view of a sound reproducing and optical projector function control apparatus designated generally as 10. As shown, a slide projector 12 of any well known type is connected by a cable 14 to a recorder-playback apparatus 16. The slide projector 12 may be any remotely controlled slide projector which responds to a remotely generated signal. Such a signal may initiate a change mechanism that causes a series of photographic transparencies to sequentially move into position for optical projection. The slide projector 12 is shown by way of example. It should be understood that other types of apparatus such as a film strip projector are equally suitable for use with the system 10. Still further, a motion picture projector or any other type of optical projection apparatus may be used with the system.

The cable 14 couples the optical projector 12 to the recorder-playback apparatus 16. Although other types of recorder-playback apparatus may be used, the recorder-playback apparatus 16 of the present invention preferably takes the form of a cassette type magnetic tape recorder-playback. The cassette recorder-playback, insofar as it records and plays back an audio presentation on a single track, is conventional. Hence, it need not be described in detail. Rather, only additions or modifications to the recorder-playback 16 are described.

The recorder-playback 16 in accordance with the present invention is a two channel (sometimes referred to as two track) device that is capable of recording electronic signals on a magnetic tape and playing back those signals in the form of an audio signal. The first channel, which may be referred to as the audio channel, provides means for recording and playing back audio information in the form of narration or music or both in the conventional manner. It may consist of one track of a two track tape head, a conventional preamplifier, amplifier, and speaker, together with other modifications as may be desired.

The recorder-playback apparatus 16 further includes a second channel through which function control information is recorded and played back. During playback, this information is passed through the cable 14 to the optical projector 12 for controlling the same. Such information may be in the form of alternating current pulses designed to initiate an advance function for the projector 12. It may also take the form of a pulse which initiates a reverse function or any other desired function.

Figure 2A:
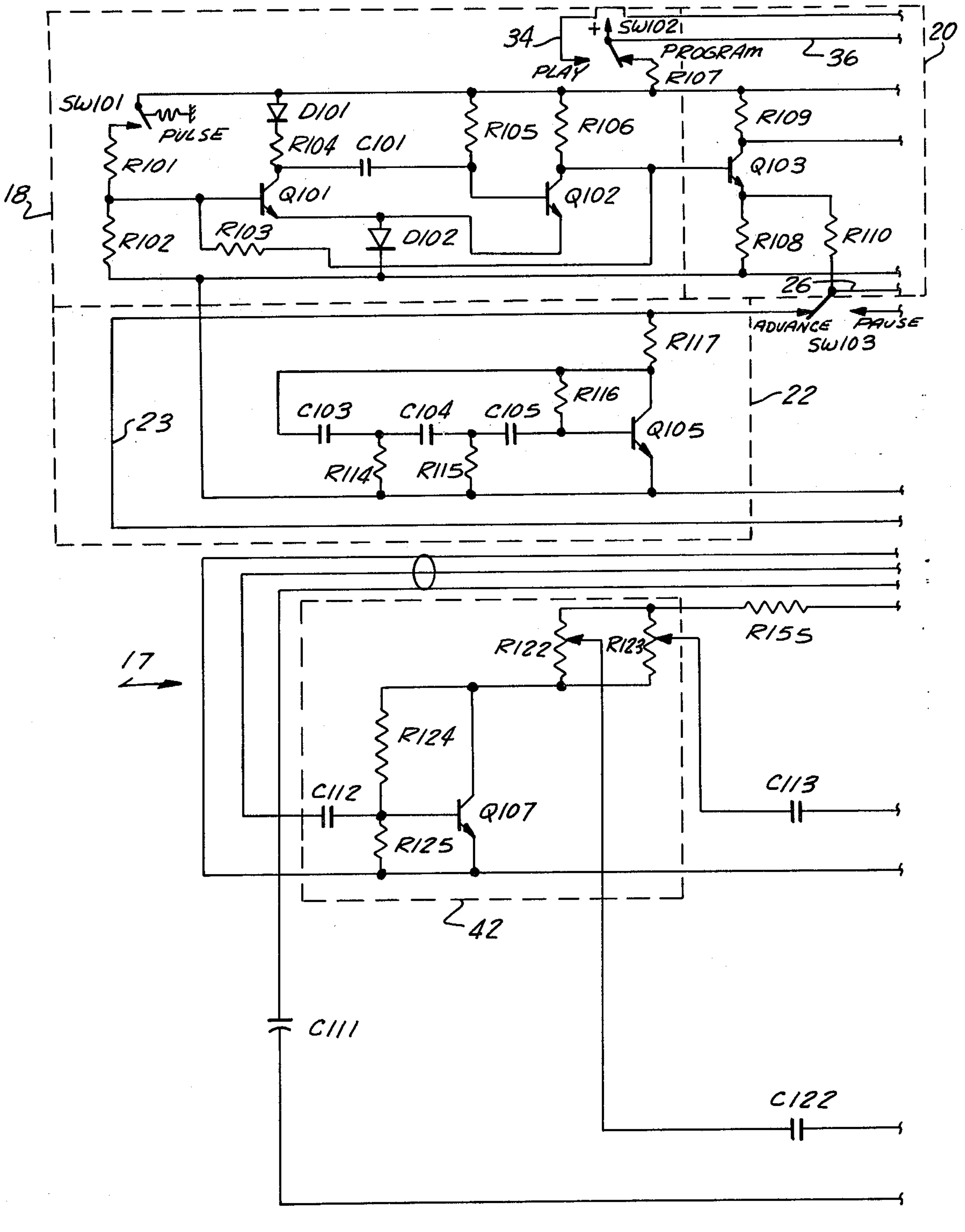
FIGS. 2A, 2B and 2C show a schematic of a function control circuit which may be incorporated into the recorder-playback apparatus of FIG. 1.
Figure 2B:
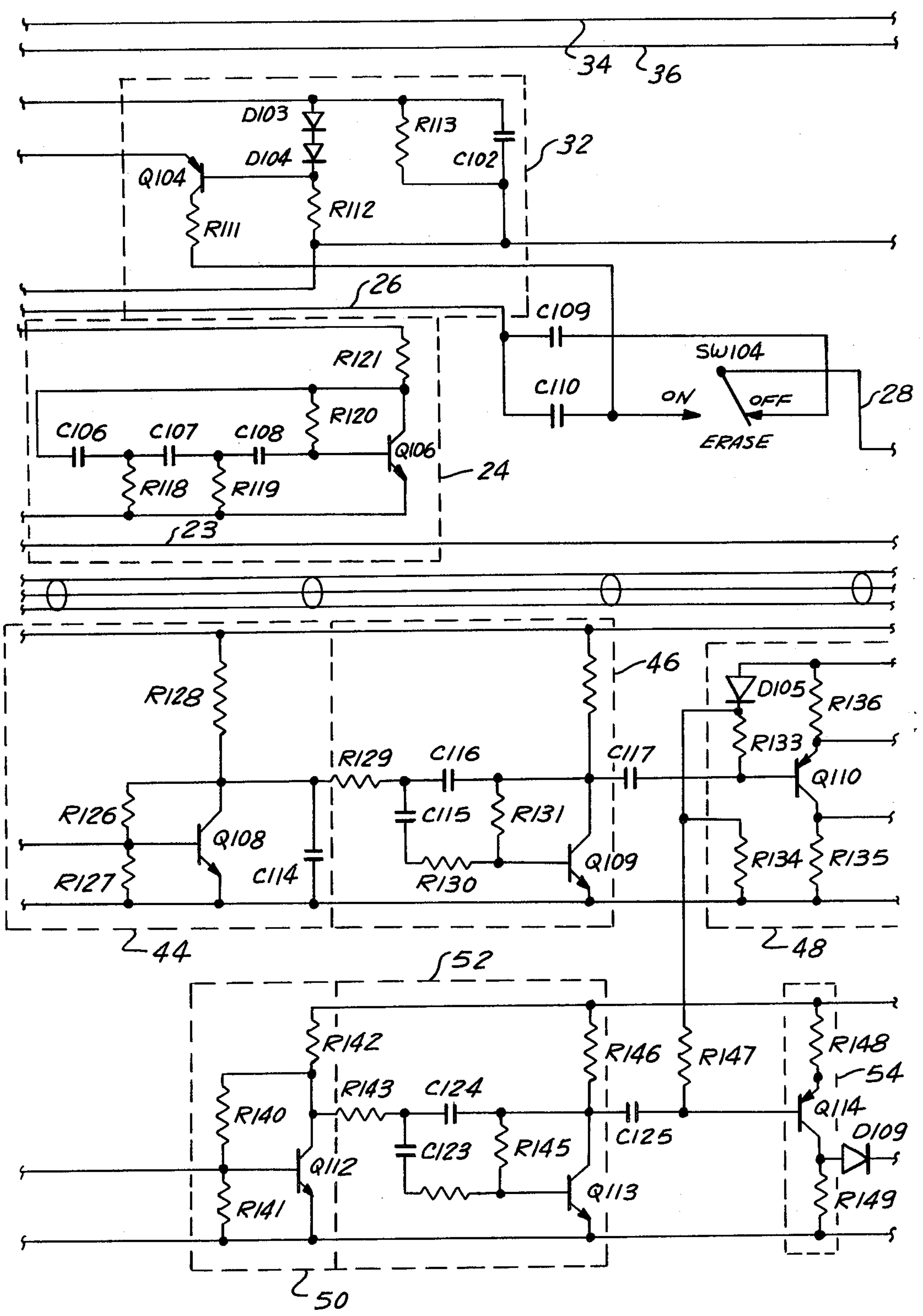
Figure 2C:
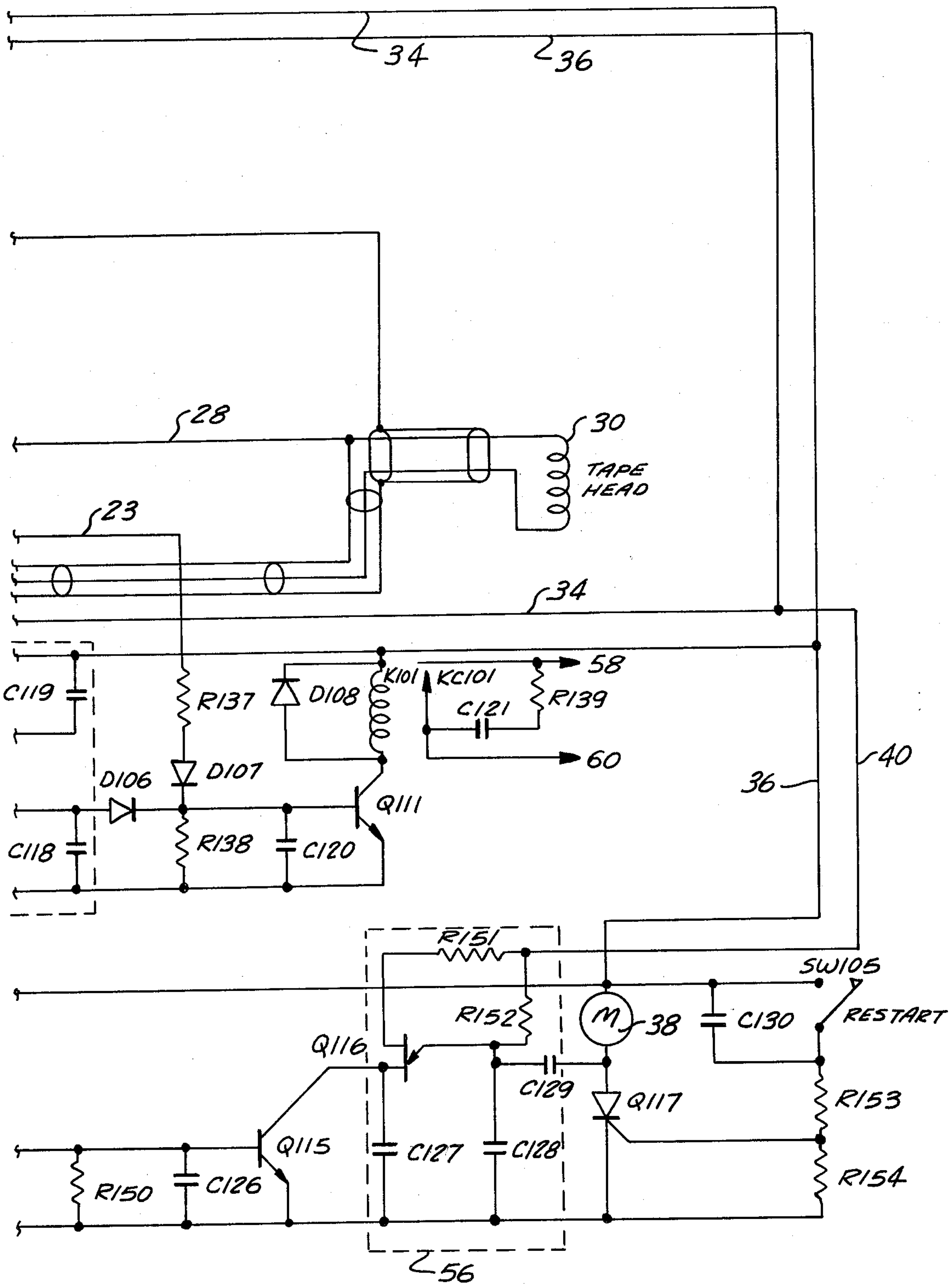

Referring now to FIGS. 2A, 2B, and 2C a schematic of the circuit 17 which forms the second or function control signal channel is illustrated. The circuit 17 in FIGS. 2A, 2B and 2C provides a means whereby the first frequency pulses may be recorded on one track of a magnetic tape and played back. These first frequency pulses may be used to advance the projector 12 from slide to slide. Still further, the circuit provides a means whereby a pulse at a second frequency may be recorded on a magnetic tape and played back for the purpose of controlling the motor drive for the magnetic tape. Thus, the circuit provides a means for not only advancing the remote projector but also for stopping the system if desired. This feature can be used where the presentation requires a rather lengthy pause before proceeding to another section. For example, a salesman using such an apparatus may wish to pause to make a special presentation or pass out samples. In a like manner, a teacher may wish to pause to pass out written material. There are, of course, a myriad of reasons for providing a means to stop the progression of the tape which will occur to users of the system.

The circuit illustrated in FIGS. 2A, 2B and 2C incorporates a number of subcircuits which, per se, are known to those skilled in the art. Accordingly, those circuits will not be described in detail. Rather, they are referred to and described according to function. Conventional symbols are used for circuit elements which are identified by letters preceding numerals with the letters designating circuit elements as follows:

Q—transistor or silicon controlled rectifier
D—diode
R—resistor
C—capacitor
SW—switch
K—relay Referring now to FIG. 2A, there is shown a one shot multivibrator 18 which provides a timing function within the programming section of the circuit. The purpose of the programming section of the circuit is to record pulses of alternating current at selected positions on the function control track of the magnetic tape. These pulses are positioned on the tape for future playback so as to initiate a control function either in the projector or in the recorder-playback apparatus 16.

To program or cue the programming function, the switch SW102 is moved to the Program position as shown in FIG. 2A. This couples the power supply into the programming section of the circuit as indicated. When the switch SW102 is moved to the Play position, the playback section of the circuit is connected for playing back the function control pulses to effect specific mechanical functions within the optical projector 12 or recorder-playback apparatus 16 as described below.

Operation of the one shot multivibrator 18 is effected by closing the switch SW101. This completes the circuit, allowing it to produce a short duration positive pulse which is applied to the transistor Q103 connected as an emitter-follower and inverter circuit 20. Although the time duration of the one shot multivibrator 18 may be adjusted, it is preferably 0.3 second.

The timed pulse generated by the one shot multivibrator 18 applies a positive pulse to the base of transistor Q103 in the emitter-follower circuit 20. The emitter-follower is biased on by the pulse and therefore completes the power circuit to either the phase shift oscillator 22 or the phase shift oscillator 24 in FIG. 2B, depending upon the position of switch SW103. In FIG. 2A the switch SW103 is shown completing the circuit to the phase shift oscillator 22. This oscillator is designed to generate an alternating current signal at approximately 1KHz. The phase shift oscillator 24 is designed to generate an alternating current signal at approximately 3.2KHz.

From the foregoing it is apparent that closing of the pulse button SW101 causes the one shot multivibrator 18 to generate a short duration pulse which keys on either the phase shift oscillator 22 or the phase shift oscillator 24, depending upon the position of the switch SW103. The amount of time which these oscillators are on is determined by the duration of the voltage generated by the one shot multivibrator 18 as applied to the base of the transistor Q103. As a result, either a 1KHz or a 3.2KHz pulse is passed along conductor 26 and through either capacitor C109 or C110, depending upon the position of erase switch SW104. Erase switch SW104 is shown in the off position. Hence, capacitor C109 couples the short duration pulse through conductor 28 into the tape head 30.

The tape head 30 is illustrated as one portion of a two channel (track) tape head which is conventional and hence need not be described in detail. The portion shown is designed to generate a magnetic field that follows the alternating current pulse coupled into it from either oscillator 22 or oscillator 24. The magnetic field of course operates upon the magnetic tape being moved past the head to record the pulse thereon. Thus, the circuit described records timed pulses on one track of a magnetic tape each time the pulse switch SW101 is closed. This may be referred to as the Program section of the circuit 17.

In the preferred embodiment of the present invention the magnetic tape is a standard tape cassette driven at approximately 1 ⅞ inches per second past the tape head 30. Such tapes are normally considered to be single track tapes. However, in accordance with the present invention the tape head 30 is designed to record and detect the conventional audio signal from less than the entire tape. The remaining portion is used as a second channel or track on which the aforementioned alternating current pulses are first recorded and then later detected and played back.

The magnetic tape is driven past the tape head 30 by the motor 38. Power for the motor 38 is supplied through conductor 36.

The 1KHz and 3.2KHz pulses recorded on the tape may also be referred to as function control pulses. It should be apparent that with the switch SW102 in the program position any number of such pulses can be selectively recorded on a magnetic tape moving past the tape head 30. The frequency of the pulse is determined by the position of the switch SW103.

An erase circuit 32 for erasing the pulses from the magnetic tape is shown in FIG. 2B. The erase circuit 32 provides a direct current to the head 30 when the erase switch SW104 is moved to the On position. Transistor Q104 is biased so as to be normally on, thus always providing an appropriate erase current at the On terminal of the erase switch SW104. Stated otherwise, the diodes D103 and D104 forward bias transistor Q104, causing it to conduct at all times. This permits existing function control pulses to be erased while at the same time applying new function control pulses. This is accomplished in the following manner. Switch SW104 is moved to the On position. Thus, all existing pulses on the tape are removed by the direct current applied to the head 30. Whenever it is desired to apply any new function control pulse to the tape, the pulse switch SW101 is depressed, thereby energizing one of the oscillators 22 or 24 as previously described. At the same time, the emitter-follower circuit 20 generates a negative pulse at the collector of transistor Q103. This negative pulse has a duration corresponding to the duration of the one shot multivibrator timing circuit 18. Its effect is to bias the transistor Q104 into a nonconducting condition, thereby removing the erase current from the head 30. Thus, each time it is desired to record a new pulse, the erase current is removed, thereby permitting the operation of the apparatus in a manner so as to simultaneously erase existing pulses.

From the foregoing it is apparent that a complete circuit for recording function control pulses on one channel of a two channel magnetic tape has been described. In addition, a circuit for erasing the pulses has also been described. The erase circuit may be considered to be part of the programming section of the circuit.

The following circuits will now describe the manner by which the recorded pulses may be played back.

To play back the pulses recorded on the magnetic tape, the switch SW102 is moved to the Play position, thereby applying power through conductor 34 to the playback section of the circuit illustrated in FIGS. 2A, 2B and 2C. Conductor 34 is connected to conductor 40 to provide power supply voltage at one base and the emitter of unijunction transistor Q116.

The tape head 30 detects and transduces both the 1KHz and 3.2KHz pulses recorded on the magnetic tape in the conventional manner. These pulses are amplified in the amplifier 42. Amplifier 42 includes two sensitivity controls in the form of potentiometers R122 and R123 which are each connected in the collector circuit of the transistor Q107.

As shown, potentiometer R123 is coupled by capacitor C113 to an amplifier 44, which is tuned to a particular frequency. In the present case the amplifier 44 is tuned to a center frequency of 1KHz. The 1KHz amplifier 44 is well known and hence need not be described in detail.

The output of amplifier 44 is passed through a filter 46, which in the preferred embodiment takes the form of a Tschebyscheff filter known to those skilled in the art. The Tschebyscheff filter has been chosen to give precise control over the band width of the frequency in the 1KHz subsection of the playback section.

The filtered signal from the filter 46 is coupled by capacitor C117 into amplifier 48. The output of amplifier 48 is detected by diode D106 which together with capacitor C120 and resistor 138 rectifies and filters the signal. The rectified signal is applied to the base of transistor Q111 which is biased to conduct when such a signal is applied to its base. Transistor Q111 is biased to normally maintain substantially no current in its collector circuit.

When transistor Q111 turns on, relay K101 closes switch contacts KC101. Relay contacts KC101 are connected in circuit with the advance control mechanism of the optical projector 12. Thus, the closing of these contacts causes the film slide tray within the optical projector to advance one slide. The mechanism for effecting the advance of the film per se forms no part of this invention. Hence it is neither shown nor described in detail.

It is apparent that the playback subsection consisting of amplifier 42, amplifier 44, filter 46 and amplifier 48 provides a means whereby the 1KHz pulses detected from a magnetic tape may be used to initiate an advance mechanism within a optical projector. Although the aforesaid channel is described with respect to 1KHz pulses, those skilled in the art will readily recognize that the particular frequency is a matter of choice. Stated otherwise, each time a pulse of the correct frequency is detected on the magnetic tape, the channel will energize relay K101, thereby causing the optical projector 12 to advance one slide. Of course other functions within the optical projector may be controlled by the closing of relay contacts KC101. Still further, optical projectors other than the slide projector 12 may have particular functions controlled by the relay K101.

With the switch SW103 in the Advance position, as illustrated in FIG. 2A, the oscillator 22 is also connected by conductor 23 to diode D107, FIG. 2C. Diode D107 rectifies and couples the 1KHz pulse signal onto the base of transistor Q111. The rectified signal energizes relay K101 causing contact with KC101 to close and thereby initiate the advance mechanism of the optical projector 12. Thus, each time a pulse is applied to the magnetic tape by closing pulse switch SW101, the slide or film within the optical projector is simultaneously advanced.

The 3.2KHz playback subsection includes potentiometer R122. The 3.2KHz signal is coupled through capacitor C122 into the amplifier 50. Amplifier 50 is tuned to a center frequency of 3.2KHz by the Tschebyscheff filter 52. Thus, the 3.2KHz subsection detects and amplifies the 3.2KHz frequency pulses recorded on the magnetic tape.

Capacitor C125 couples the output of filter 52 into amplifier 54, which amplifies the 3.2KHz signal. The output of amplifier 54 is rectified and filtered by diode D109 and capacitor C126 as well as resistor R150. This rectified and filtered signal is applied to the base of transistor Q115 which turns on via unijunction transistor Q116 in circuit 56 by appropriately biasing the base of unijunction transistor Q116 connected in the collector circuit. The unijunction transistor in turn provides a positive pulse at its emitter which is coupled by capacitor C129 to the anode of silicon controlled rectifier (SCR) Q117 connected in series with motor 38. This positive pulse interrupts the holding current of the SCR Q117 long enough to turn it off. Hence, the motor 38 is turned off, thereby stopping the tape drive mechanism.

The motor 38 can be started again by applying an appropriate bias to the gate terminal of SCR Q117. This is accomplished by closing restart switch SW105. Closing restart switch SW105 provides the appropriate bias voltage at the gate of SCR Q117 by discharging capacitor C130 through the voltage divider consisting of resistors R153 and R154.

It is apparent that the playback subsection comprising amplifier 50, filter 52, and amplifier 54 provides a control function by detecting 3.2KHz pulses recorded on the magnetic tape and using such detected pulses to control the function of drive motor 38. Of course, frequencies other than 3.2 KHz can be used. Moreover, control functions other than turning off motor 38 can be accomplished. For example, the same pulse can be used to reverse the slide changing mechanism within projector 12 by means of circuitry similar to that associated with relay K101.

The foregoing circuit 17 provides two control functions in the manner described. Those skilled in the art will recognize that three or more control functions can be provided by duplicating portions of a programming and playback section of the circuit. Thus, a third phase shift oscillator at still another frequency could be added to the programming section with an appropriate modification to switches SW103. Similarly, a third channel similar to the existing two playback subsection can be added.

Figure 4:
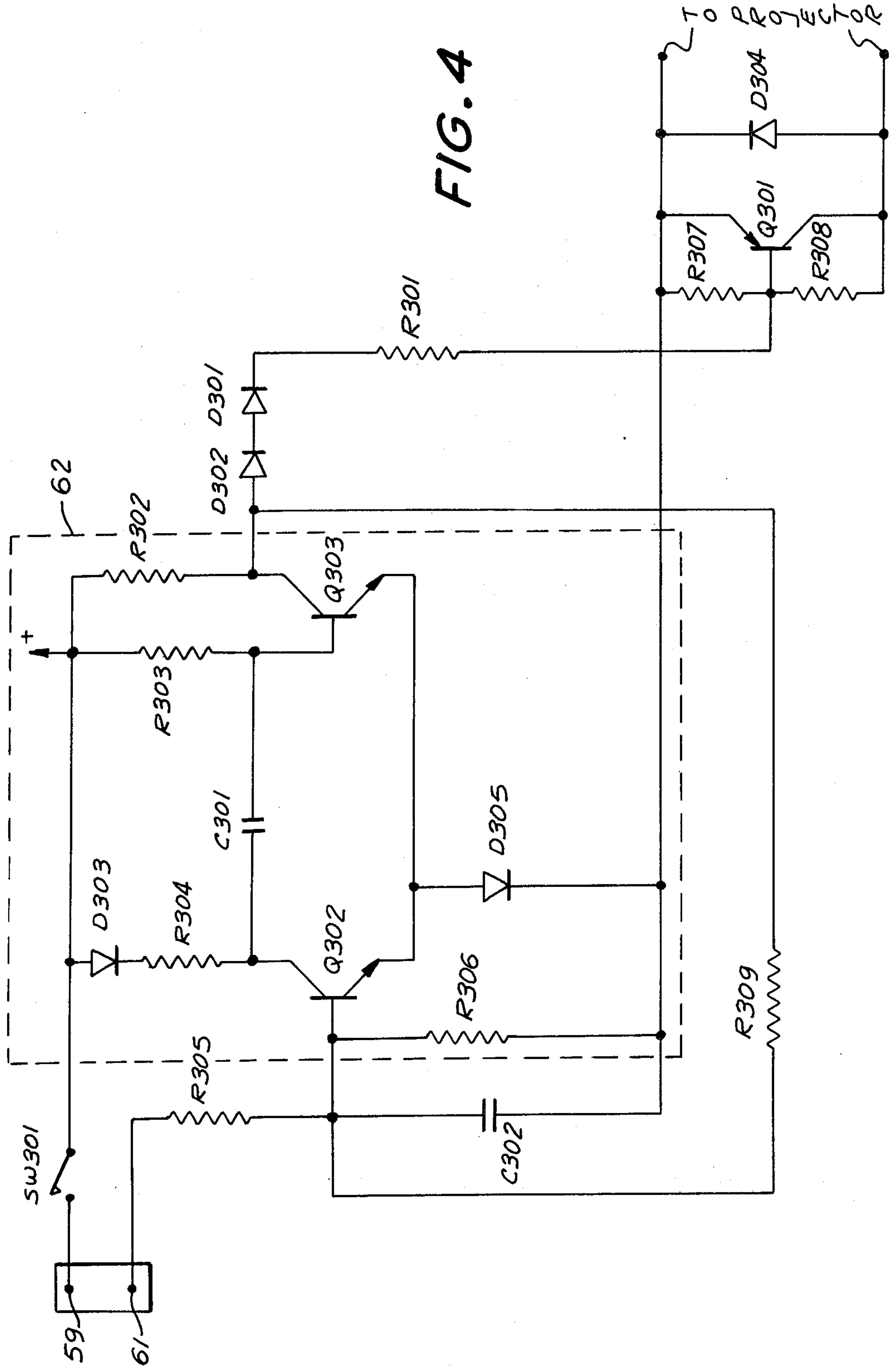
FIG. 4 is a schematic of a switching circuit which may be used with the circuit of FIGS. 2A, 2B and 2C to form another embodiment of the present invention.

Referring now to FIG. 4, there is shown a circuit for changing the circuit 17 illustrated in FIGS. 2A, 2B and 2C from a normally open switch to a normally closed switch. Thus, the relay contact KC101 in FIG. 2C is normally open. Such a circuit is necessary for certain types of projectors such as the Kodak MFS–8 projector manufactured by the Eastman Kodak Company of Rochester, New York. The Kodak MFS–8 projector responds to the opening of a switch rather than to the closing of a switch. The circuit illustrated in FIG. 4 may be added to the circuit illustrated in FIGS. 2A, 2B and 2C to provide the normally closed switch function when desired.

As shown, the terminals 58 and 60 of relay KC101 are connected to the terminals 59 and 61, respectively, in FIG. 4. As thus connected, the closing of relay contacts KC101 completes the circuit through a one shot multivibrator 62 which generates a voltage pulse for a limited amount of time. In the preferred embodiment of the invention this pulse lasts approximately 6 milliseconds. However, pulses of greater or shorter duration may be provided by adjusting the parameters of the circuit elements in a one shot multivibrator 62. The pulse generated by the one shot multivibrator 62 is rectified by diodes D302 and D301 so that a positive pulse appears on the base of transistor Q301. Transistor Q301 is biased so as to be normally on thus having the electrical effect of a closed switch. The positive voltage pulse applied through diodes D302 and D301 momentarily biases the transistor Q301 into an off condition. This has the same electrical effect as opening a mechanical switch contact, thereby causing the projector to respond by advancing the film one frame or otherwise perform a predetermined function.

The circuit illustrated in FIG. 4 may be selectively added to the circuit illustrated in FIGS. 2A, 2B and 2C by closing the switch SW301.

Figure 3:
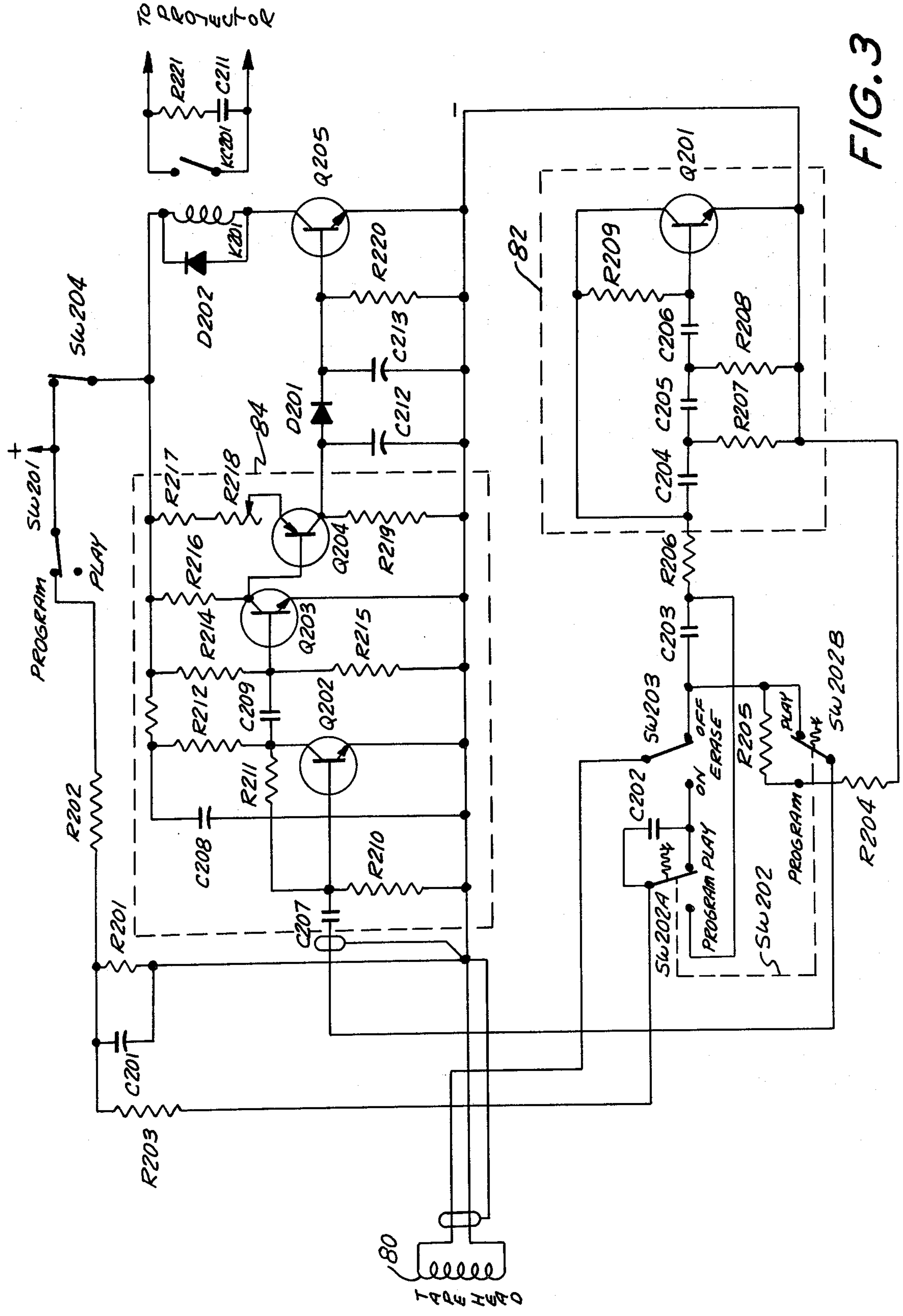
FIG. 3 illustrates another embodiment of a function control circuit which may be incorporated into the recorder-playback apparatus of FIG. 1.

Referring now to FIG. 3 there is shown yet another embodiment of the present invention. This embodiment is similar to the circuit 17 of FIGS. 2A, 2B and 2C with the exception that only a single frequency is recorded on and played back from a magnetic tape moving past the tape head 80.

To record function control pulses on a magnetic tape moving past the two track head 80, the switch SW202 is moved to the Program position thereby moving the contact SW202A and SW202B into the indicated Program position. This connects the phase shift oscillator 82 to the tape head 80 thereby allowing it to record an alternating current pulse on the magnetic tape moving past the tape head 80. In the preferred embodiment, the alternating current pulse has a frequency of approximately 1KHz. However, this frequency may be adjusted as desired. The pulse is recorded on the magnetic tape as long as the switch SW202 is held in the Program position. Normally this is controlled by the operator who waits until the film advances one slide or frame. The Advance function is accomplished by connecting the 1KHz output of phase shift oscillator 82 through switch SW202B into the playback amplifier 84. This in turn causes the relay K201 to close its contact KC201 in the manner described below.

The pulses may be erased from the magnetic tape by moving the Erase switch SW203 from its Off position to its On position. This connects the tape head directly to the direct current power supply through the resistors R203 and R202.

To playback pulses previously recorded on the magnetic tape moving past tape head 80, the switch SW201 is moved to the Play position as is switch SW202. Switch SW203 is of course moved to the Off position.

The signals transduced by the tape head 80 are amplified by the three stage amplifier 84. Potentiometer R218 provides gain control in the output stage of the amplifier. Moreover, transistor Q204 is biased to reduce the DC level of the amplified signal to zero. The amplified alternating current pulse control signal is rectified and filtered by diode D201, capacitors C212, C213 and resistor R20. This signal, when applied to the base of transistor Q205, causes it to conduct. This energizes relay K201 closing relay contact KC201. The closing of relay contact KC201 in turn initiates an appropriate function within the projector 12 or similar apparatus.

Thus, the circuit illustrated in FIG. 3 provides apparatus for recording, erasing and playing back single frequency function control pulses on one track of a magnetic tape. These function control pulses can be used to control an optical projector as described above.

The present invention may be embodied in other specific forms without departing from the spirit or essential attributes thereof and, accordingly, reference should be made to the appended claims, rather than to the foregoing specification as indicating the scope of the invention.

I claim:

1. An apparatus for reproducing sound from a sensible medium and controlling a function in an optical projector, comprising: motive means for moving said sensible medium relative to first and second transducers, said sensible medium having at least two channels, first playback means associated with said first transducer and operative during a playback mode to transduce audio information from a first channel of said sensible medium into an electronic sound signal, second playback means associated with said second transducer and also operative during a playback mode for transducing function control pulses from a second channel of said sensible medium into an electronic function control signal, said apparatus containing a programming section, including a signal generator and operative during a recording mode, for selectively recording said function control pulses, via said second transducer, onto said second channel of said sensible medium, characterized in that said programming section comprises:

a. timing means for providing a timing signal of a fixed duration upon actuation of said timing means, said signal generator being responsive to said timing signal such that said signal generator provides a function control pulse only in response to and for the duration of said timing signal, whereby the length of each of said function control pulses will be uniform and precisely controlled, and b. erase means for normally supplying an erase signal to said second transducer for erasing information from said second channel of said sensible medium, said erase means being responsive to said timing signal such that said erase means will not supply said erase signal for the duration of said timing signal, whereby said control pulses can be recorded upon and erased from said second channel of said sensible medium with but a single transducer.

2. The apparatus of claim 1 wherein said timing means comprises a monostable multivibrator.

3. The apparatus of claim 1 wherein said programming section includes two signal generators, each arranged to provide a different frequency signal, and a switch for selectively connecting the output of said timing means to either of said signal generators, whereby function control pulses of two distinctive frequencies and uniform length can be selectively recorded on said sensible medium.

4. The apparatus of claim 3 further including pause means responsive to the signal provided by one of said signal generators for interrupting operation of said motive means.

5. The apparatus of claim 3 wherein said pause means comprise a frequency detector and a bistable circuit responsive to the output of said frequency detector for changing its state to interrupt said motive means, said apparatus including means for resetting said bistable circuit to restore operation of said motive means.

6. An apparatus for reproducing sound from a sensible medium and controlling a function in an optical projector, comprising: motive means for moving said sensible medium relative to first and second transducers, said sensible medium having at least two channels, first playback means associated with said first transducer and operative during a playback mode to transduce audio information from a first channel of said sensible medium into an electronic sound signal, second playback means associated with said second transducer and also operative during a playback mode for transducing function control pulses from a second channel of said sensible medium into an electronic function control signal, said apparatus containing a programming section, including a signal generator and operative during a recording mode, for selectively recording said function control pulses, via said second transducer, onto said second channel of said sensible medium, characterized in that said programming section comprises erase means for normally supplying an erase signal to said second transducer for erasing information from said second channel of said sensible medium, said erase means being responsive to an output of said programming section such that said erase means will not supply said erase signal during the intervals when said programming section provides one of said function control pulses, whereby said control pulses can be recorded upon and erased from said second channel of said sensible medium with but a single transducer.

7. The apparatus of claim 6 wherein said programming section also comprises timing means for selectively providing a timing signal of a fixed duration upon actuation of said timing means, said signal generator being responsive to said timing signal such that said signal generator will provide a function control pulse only in response to and for the duration of said timing signal, whereby the length of each of said function control pulses will be uniform and precisely controlled.

8. The apparatus of claim 7 wherein said programming section includes two signal generators, each arranged to provide a different frequency signal, and a switch for selectively supplying said timing signal to either of said signal generators, whereby function control pulses of two distinctive frequencies and uniform length can be selectively recorded on said second channel of said sensible medium.

9. The apparatus of claim 8 further including pause means responsive to the signal provided by one of said signal generators for interrupting operation of said motive means.

10. The apparatus of claim 9 wherein said pause means comprises a frequency detector and a bistable circuit responsible to the output of said frequency detector for changing its state to interrupt said motive means, said apparatus including means for resetting said bistable circuit to restore operation of said motive means.

* * * * *